(12) United States Patent
Perrow (10) Patent No.: US 9,672,531 B1
(45) Date of Patent: *Jun. 6, 2017

(54) SUPPLEMENTAL CONTENT PREDICTION TO REDUCE BLINK-IN EFFECT

(71) Applicant: Google Inc., Mountain View, CA (US)

(72) Inventor: Michael S. Perrow, Pyrmont (AU)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,771

(22) Filed: Jul. 25, 2016

Related U.S. Application Data (63) Continuation of application No. 14/327,250, filed on Jul. 9, 2014, now Pat. No. 9,426,205, which is a continuation of application No. 13/421,368, filed on Mar. 15, 2012, now Pat. No. 8,806,017.

(51) Int. Cl.
*G06F 15/16* (2006.01)
*G06Q 30/02* (2012.01)
*H04L 29/06* (2006.01)

(52) U.S. Cl.
CPC ..... *G06Q 30/0256* (2013.01); *G06Q 30/0277* (2013.01); *H04L 67/42* (2013.01)

(58) Field of Classification Search
USPC .................................................. 709/223, 226
See application file for complete search history.

(56) References Cited

U.S. PATENT DOCUMENTS

2009/0319355 A1* 12/2009 Sinyagin et al. .......... 705/14.25

* cited by examiner

*Primary Examiner* — Hee Soo Kim
(74) *Attorney, Agent, or Firm* — Fish & Richardson P.C.

(57) ABSTRACT

Methods, systems, and apparatus, including computer programs encoded on a computer storage medium, for determining, for each of a plurality of resource requests for a resource that includes first content, whether a supplemental content event has occurred. The occurrence of the supplemental content event indicates that supplemental content will likely be served to a user device after the resource is served to the user device. For each resource request for which the supplemental content event has occurred, the resource is served with a defined supplemental content environment in which the supplemental content is to be displayed, the supplemental content environment being of dimensions that accommodate display of the supplemental content without adjustment of display of the first content upon the user device rendering the resource. For each resource request for which the supplemental content event has not occurred, the resource is served without the defined supplemental content environment.

9 Claims, 6 Drawing Sheets

SUPPLEMENTAL CONTENT PREDICTION TO REDUCE BLINK-IN EFFECT

CROSS-REFERENCE TO RELATED APPLICATIONS

This application is a continuation application of and claims priority to U.S. patent application Ser. No. 14/327,250, entitled "Supplemental Content Prediction to Reduce Blink-In Effect," filed on Jul. 9, 2014, now U.S. Pat. No. 9,426,205, which is a continuation application of and claims priority to U.S. patent application Ser. No. 13/421,368, now U.S. Pat. No. 8,806,017, entitled "Supplemental Content Prediction to Reduce Blink-In Effect," filed on Mar. 15, 2012. The disclosure of the foregoing application is incorporated herein by reference in its entirety for all purposes.

BACKGROUND

This specification relates to digital information retrieval.

Often a user may submit information to a service that provides a web page that includes content responsive to the information. For example, a search results web page can include search results provided by a search engine in response to a user's search query, or a mapping web page may include a map provided by a map service in response to a user's query for a map. For such web pages, additional content may be provided by another entity, such as advertisements provided by an advertisement server. The additional content is provided by content item servers in response to content item requests that are generated during the rendering of the web page by a client device.

In some cases, the identification of the additional content may depend on the content of the search results page, including the search results and related data. The additional content may therefore be requested asynchronously from the original search query based on info not yet available at the time the search results are initially presented to be served on the search results page. A search results web page is therefore served without the additional content.

In some cases, subsequent to the initial serving of the page, one or more pieces of additional content to serve are identified. For example, a maps service may wait until driving directions results have been computed so that it can use route information to target advertisements. Often some of the additional content will displace content already present on the page. For example, if an advertisement that is served is to be rendered at a location that will displace previously rendered content (e.g., a "top" position advertisement), the resulting displacement of the previously rendered content creates a "blink-in" effect. As used herein, the term "blink-in" refers to the displacement of previously rendered content from a first location to a second location and the rendering of additional content that is received subsequent to the rendered content in the first location. Unexpectedly moving content on the page to accommodate this additional content may degrade the user's experience.

SUMMARY

This specification describes technologies relating to consolidating content item to requests for two or more content item environments in a webpage.

In general, one innovative aspect of the subject matter described in this specification can be embodied in methods that include the actions of determining, for each of a plurality of resource requests for a resource that includes first content, whether a supplemental content event has occurred, the occurrence of the supplemental content event indicating that supplemental content will likely be served to a user device after the resource is served to the user device; for each resource request for which the supplemental content event has occurred, serving the resource with a defined supplemental content environment in which the supplemental content is to be displayed, the supplemental content environment being of dimensions that accommodate display of the supplemental content without adjustment of display of the first content upon the user device rendering the resource; and for each resource request for which the supplemental content event has not occurred, serving the resource without the defined supplemental content environment. Other embodiments of this aspect include corresponding systems, apparatus, and computer programs, configured to perform the actions of the methods, encoded on computer storage devices.

These and other embodiments can each optionally include one or more of the following features. Determining whether a supplemental content has occurred may include determining, for each resource, a likelihood that supplemental content will be served and determining that the supplemental content event has occurred when the likelihood meets a threshold likelihood.

For each resource request for which the likelihood meets a threshold likelihood, the served resource may include instructions that cause the client device to preclude display of a portion of the first content upon the rendering of the resource. The portion of the first content in the supplemental content environment may be displayed after an expiration of a time period during which the supplemental content is not received at the client device.

For each resource request for which the likelihood meets a threshold likelihood, the served resource may include instructions that cause the client device to request additional content after expiration of a time period during which the supplemental content is not received at the client device.

The method may further include determining, for a resource request for which the likelihood was determined to meet the threshold likelihood, that the supplemental content has not been served to the user device at the expiration of a time period and, in response, serving additional content to the user device for display in the supplemental content environment. The method may also preclude the serving of supplemental content to a user device that received a resource in response to a resource request for which the likelihood does not meet the threshold likelihood. Each resource require may include a query, and determining a likelihood that supplemental content will be served to a user device after the resource is served to the user device may include determining the likelihood based on the query.

Particular embodiments of the subject matter described in this specification can be implemented so as to realize one or more of the following advantages. When the additional content is predicted as likely to be served for a resource that has already been served, reserving space for the additional content preserves the layout of the resource, accommodating the additional content without moving other content on the page. The user experience is enhanced relative to the user experience for a resource that "blinks in" additional content.

Furthermore, reducing the instance of "blink in" effects facilitates a smoother user experience with fewer disruptions. Displaying space for the additional content along with the initial display of the resource allows the user to anticipate and accept the subsequent serving of the ad in the reserved space.

Generally, predicting and accommodating supplemental content increases the ability to project a stable, unified web page design and prevents user confusion or the disruption of a user interaction with the page.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

To reduce the likelihood of a "blink-in" occurring, a serving system determines whether a supplemental content event has occurred. A supplemental content event indicates that supplemental content, such as an advertisement, will likely be served for a resource, such as a web page, that is to be rendered before the supplemental content can be served. If a supplemental content event has occurred, then the resource is served with a space for the supplemental content. Thus, when the resource is rendered and the supplemental content is received after the resource is rendered, there is no discernable blink-in effect. If the prediction is incorrect and supplemental content is not served, the resource can request supplemental content, or filler content can be pushed from the server, or additional content that was originally served with the resource can be displayed in the space.

Conversely, if the supplemental content event has not occurred, then the resource is served without the space for the supplemental content. In the event that the prediction is incorrect, the blink-in can be allowed to occur. Alternatively, the serving of the content can be precluded.

Example Environment

Figure 1:
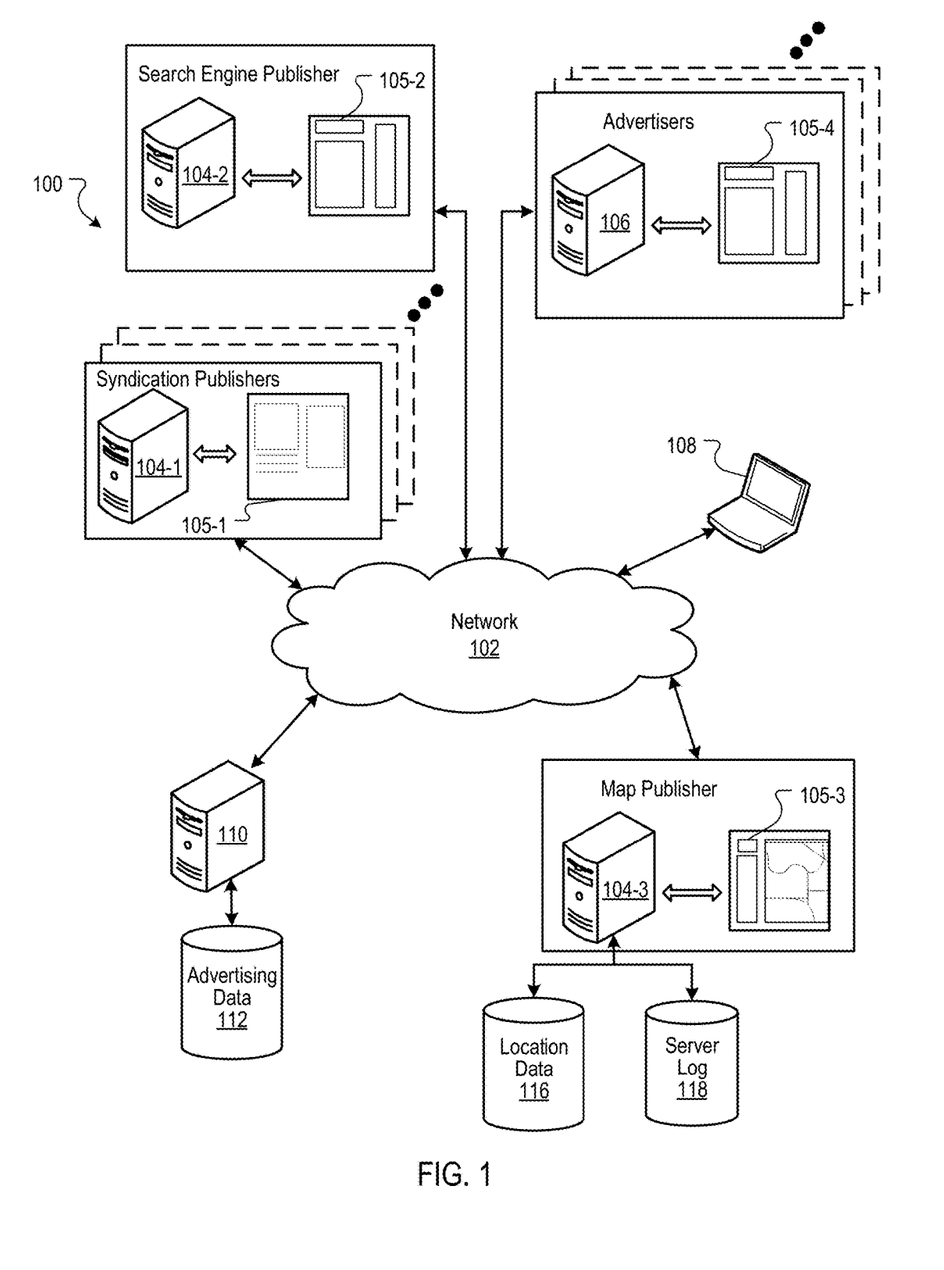
FIG. 1 is a block diagram of an example environment in which content items are provided to a user device.

FIG. 1 is a block diagram of an example environment in which content items are provided to user devices. A computer network 102, such the Internet, or a combination of the Internet and one or more wired and wireless networks, connects publishers 104, such as syndication publishers 104-1, a search engine publisher 104-2, and a map publisher 104-3, advertisers 106, a user device 108, and an advertisement management system 110. Only one representative entity is respectively shown for the syndication publisher 104-1 and the advertiser 106. However, the online environment 100 connects many thousands of publishers and advertisers, as indicated by the phantom figures behind the syndication publisher 104-1 and the advertiser 106.

The user device 108 is an electronic device that is under control of a user and is capable of requesting and receiving resources 105 over the network 102. Example user devices 108 include personal computers, mobile communication devices and other devices that can send and receive data over the network 102. A user device 108 typically includes a user application, such as a web browser or other communication software, to facilitate the sending and receiving of data over the network 102.

The publishers 104 and, optionally, the advertisers 106 maintain web sites. Each web site is one or more resources 105 associated with a domain name, and each is hosted by one or more servers. A resource is any data that can be provided by the web site over the network 102 and that is associated with a resource address. Resources include HTML pages, RSS feeds, and video, for example. To avoid congestion in the drawings, the resources 105 are represented as web pages; however, the representations of FIG. 1 are inclusive of all types of resources that are consistent with the above definition.

As will be described in more detail below, each of the publishers 104 are in data communication with the advertisement management system 110 and together the publishers 104 and the advertisement management system 110 facilitate the provisioning of advertisements with the publisher resources 105-1, 105-2, or 105-3. In particular, the advertisement management system 110 allows advertisers to define targeting rules that take into account attributes of the particular user to provide targeted advertisements for the users.

These targeted advertisements can be provided in many different properties, such as the properties of the syndication publisher 104-1, the search engine publisher 104-2, and the map publisher 104-3. The syndication publisher 104-1 is a general content web site, e.g., a sports related web site, a news related web site, a social network web site, etc. When a user device 108 receives a resource 105-1 from the syndication publisher 104-1, the user device renders the webpage 105-1. The webpage 105-1 includes instructions that cause the user device to request advertisements from the advertisement management system 110. The advertisement management system 110, in turn, provides targeted advertisements to the particular user. When a user selects an advertisement, the user device 108 generates a request for a landing page of the advertisement, which is typically a webpage 105-4 of the advertiser 106.

The search engine publisher 104-2 is provides search results that each identify a resource that is determined to be responsive to a query. Each search result generally includes a reference (e.g., a URL) to the underlying resource, an image and/or a snippet of text from the underlying resource, and optionally other information. Selection of a search result at the client device 108 causes the client device 108 to send a request to the publisher 104 hosting the underlying resource 105. The resource is then served to the client device 108 in response.

Similarly, the map publisher 104-3 is a web site providing information to a user relating to geographic location. A user may request data associated with a specific geographic location. The map publisher 104-3 sends a map resource 105-3 to the device 108, which renders the webpage 105-3. The advertisement management system 110 may also provide advertisements to be displayed on the webpage 105-3, which may be related to the user's query and the geographic location data returned by the map publisher 104-3. As described above, user selection of an advertisement may result in presentation of an advertiser webpage 105-4.

The advertisement management system 110 includes a data storage system that stores advertising data 112. The advertising data 112 stores advertisements, targeting information, and budgeting information for advertisers 106. The advertisement management system 110 serves advertisements to the user device 108 in response to a request for advertisements. The request may come directly from the user device 108, or from a publisher 104 that serves a resource to the client device.

Supplemental Content

As used in this specification, the term "supplemental content" is content that is served for presentation within a rendered resource on a client after the resource has been served to the client device. As described above, there may be situations in which a resource is served before supplemental content can be provided. This may occur for any resource 105 that is configured to generate space for the supplemental content. In the illustrative example below, the serving of supplemental content is described in the context of a resource that includes map data. However, the features of determining the occurrence of a supplemental content event to reduce the blink-in effect can be applied to any resource in which supplemental content may be served, and is not limited to map resources.

To serve the resource 105-3, the map publisher 104-3 may include a data storage system that stores location data 116 and a log 118 of prior map resource webpages. The location data 116 stores geographic information, such as the coordinates and addresses for locations, both commercial and residential. The log 118 stores a history of past locations and queries and their results, particularly whether a given query and/or location prompted the display of additional content.

Requests for an advertisement for display on a map resource webpage 105-3 may occur at various points during the processing of the webpage 105-3. For example, when a user first submits a request for a map resource webpage, the query may be forwarded to the advertisement management system 110 to generate ads to display on the webpage 105-3. Subsequently, when the map publisher 104-3 retrieves location data to serve on the webpage 105-3, the location data may also be sent to the advertisement management system 110, which may identify ads for display. Furthermore, after the webpage 105-3 is first displayed to a user, further input by the user, such as a request for directions or other data associated with the map resource, may cause the advertisement management system 110 to return advertisements for display.

Any of these events may trigger the search for and identification of ads within the advertisement management system 110, and this may occur asynchronous to the serving of the webpage 105-3 as carried out by the map publisher 104-3. Because the system 110 may return advertisement results after the webpage 105-3 has already been displayed to a user, the webpage 105-3 may include reserved space in which the advertisement can display once it is served. The map publisher 104-3 may access the historical data within the server log 118 in order to predict the likelihood that an advertisement will serve, and include the reserved space only if the likelihood is above a threshold level.

In other implementations, the advertisement management system 110 may access the historical data within the server log 118 and make the prediction, and instruct the map publisher 103 to include the reserved space if the likelihood is above the threshold level. The examples below, however, are described in the context of the prediction being made by the map publisher 104-3.

Display of Requested Content

Figure 2A:
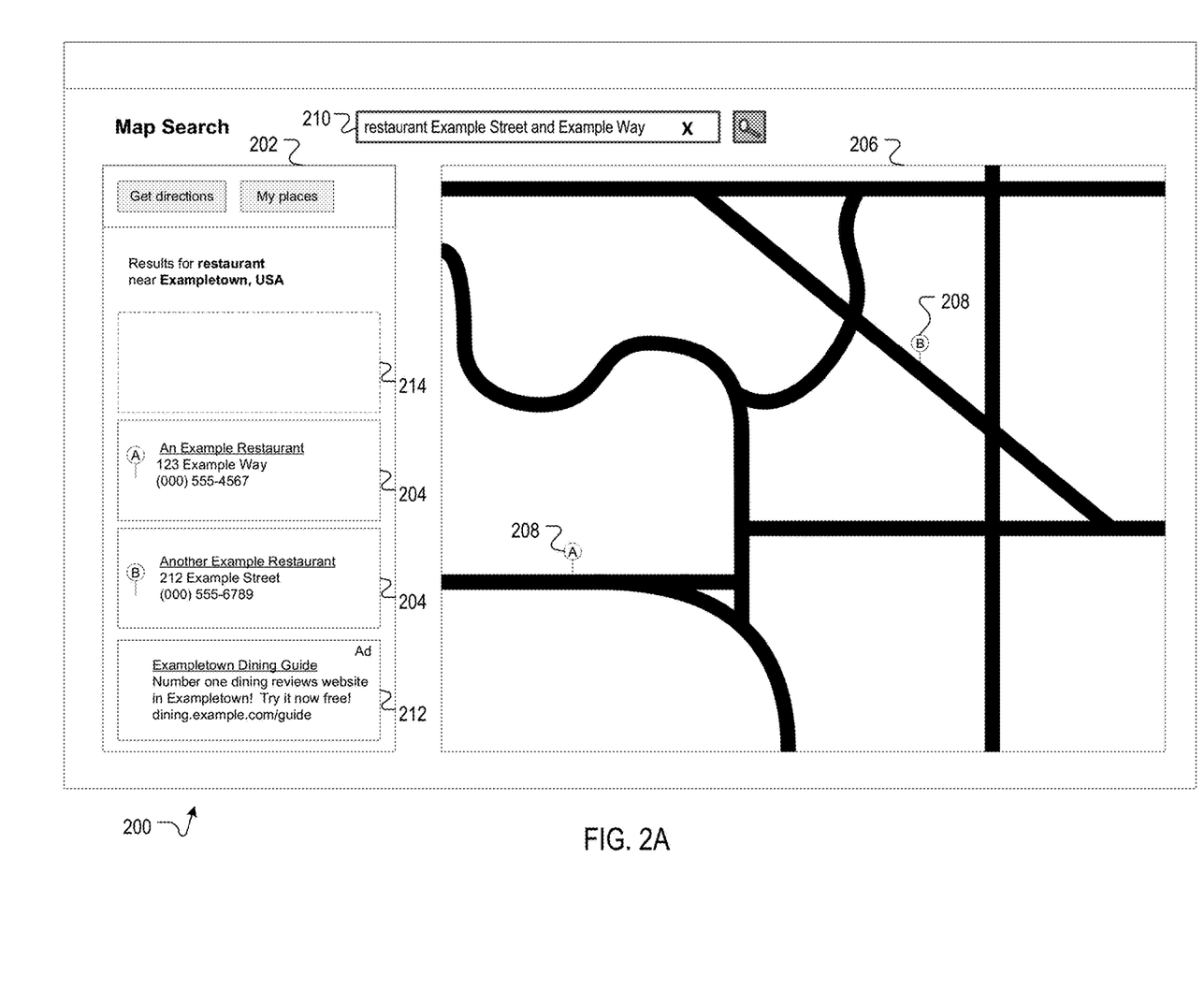
FIGS. 2A and 2B depict exemplary screen shots of a map resource webpage accommodating a later-served advertisement.
Figure 2B:
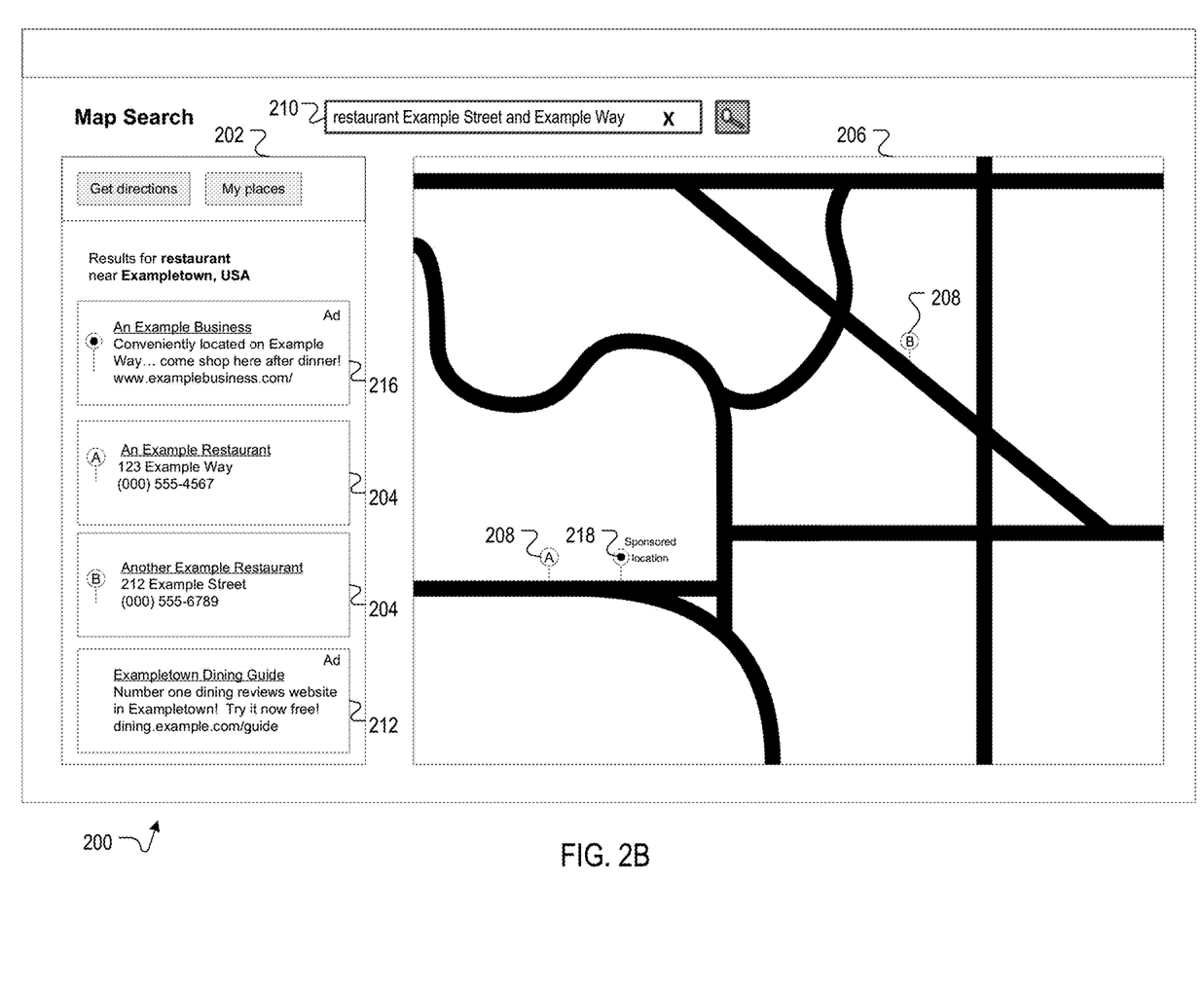

FIGS. 2A and 2B depict exemplary screen shots of a map resource webpage 200 accommodating a later-served advertisement. In particular, FIG. 2A depicts the resource webpage 200 that may be served by a map publisher 104-3 when the map publisher 104-3 has determined that supplemental content event has occurred. The map resource webpage 200 may include a results portion 202 having a list of location results 204, and may also include a map 206 with markers 208 each associated with one of the location results 204. The webpage 200 may be served in response to a query, which may be entered into a search box 210.

In addition to location results 204, the results portion 202 of the map resource webpage 200 may include one or more advertisements. In the example shown in FIG. 2, an advertisement 212 is displayed in the results portion 202. The advertisement 212 may be based on the same query and location information used to generate the location results 212, but is not necessarily associated with a location. For example, the advertisement 212 shown in FIG. 2A advertises a dining website and is not associated with a location, but is nonetheless relevant to the query.

In response to a determination that a supplemental ad is likely to be served, a placeholder location 214 is provided in the results portion 202, identified in FIG. 2A by broken lines. The placeholder location 214 is a supplemental content environment in which supplemental content can be rendered within the webpage 200. Although shown as essentially a blank space, the placeholder location 214 may include additional formatting such as a box or other frame outline, a label (similar to the "Ad" label on the advertisement 212), a different color, or some other way to mark the space. Filler content, such default text, a logo, or some other content for which the displacement by an advertisement would be minimally disruptive to the user experience, can also be supplied for use in the placeholder space 214 with the webpage 200.

Subsequent to serving the webpage 200, an advertisement may be supplied for display in the place held by the placeholder 214, as shown in FIG. 2B. Here, an advertisement 216 is displayed in the results portion 202. The advertisement 216 includes a location, which is marked on the map 206 with a location marker 218.

In some implementations, the advertisement 218 may be returned based on the location results associated with the initial location query, and may therefore be supplied and added to the page without requiring any user interaction. If the advertising system is able to process the location results and locate an ad quickly, the advertisement 216 may replace the placeholder 214 within a very small time window, further minimizing the disruption to the user. However, should the advertising system take longer to identify and deliver the advertisement 216 for display on the webpage 200, the advertisement 216 does not disturb the layout of other items on the page in replacing the placeholder.

In some implementations, the advertisement 216 may be based on further input by the user. For instance, the advertisement 216 may be supplied when the user interacts with one of the results, the map, or one of the existing ads. Any subsequent information generated by the user's interaction with the map resource webpage 200 may be used by the advertising system to identify and serve an ad. In these implementations, the placeholder 214 is displayed at least until the user interaction occurs and an ad is generated and served in response, at which point the placeholder 214 may be replaced by the advertisement 218 as shown.

In the absence of a placeholder 214, the introduction of the advertisement 216 to the top of the list of results in the results portion 202 would have forced each of the results 204 and the advertisement 212 to relocate further down on the page, a "blink-in" effect. The experience of a user reading or interacting with these elements could be degraded as the content is displaced when the supplemental ad is rendered. Additionally, a poorly-timed "blink-in" could result in a click on a result other than the one intended by the user. Thus, by providing a placeholder 214 to accommodate the later advertisement 216 without relocating any other content on the webpage 200, the potential for degradation of the user experience is reduced.

Had the map publisher 104-3 determined that a supplemental content event did not occur, then the map publisher 104-3 would not define the supplemental content environment in the webpage 200. In other words, the webpage 200 would not include the placeholder location 214.

Example processes for serving resources based on the likelihood of supplemental content being served for the resources are described with reference to FIGS. 3, 4A and 4B below.

Supplemental Content Prediction

Figure 3:
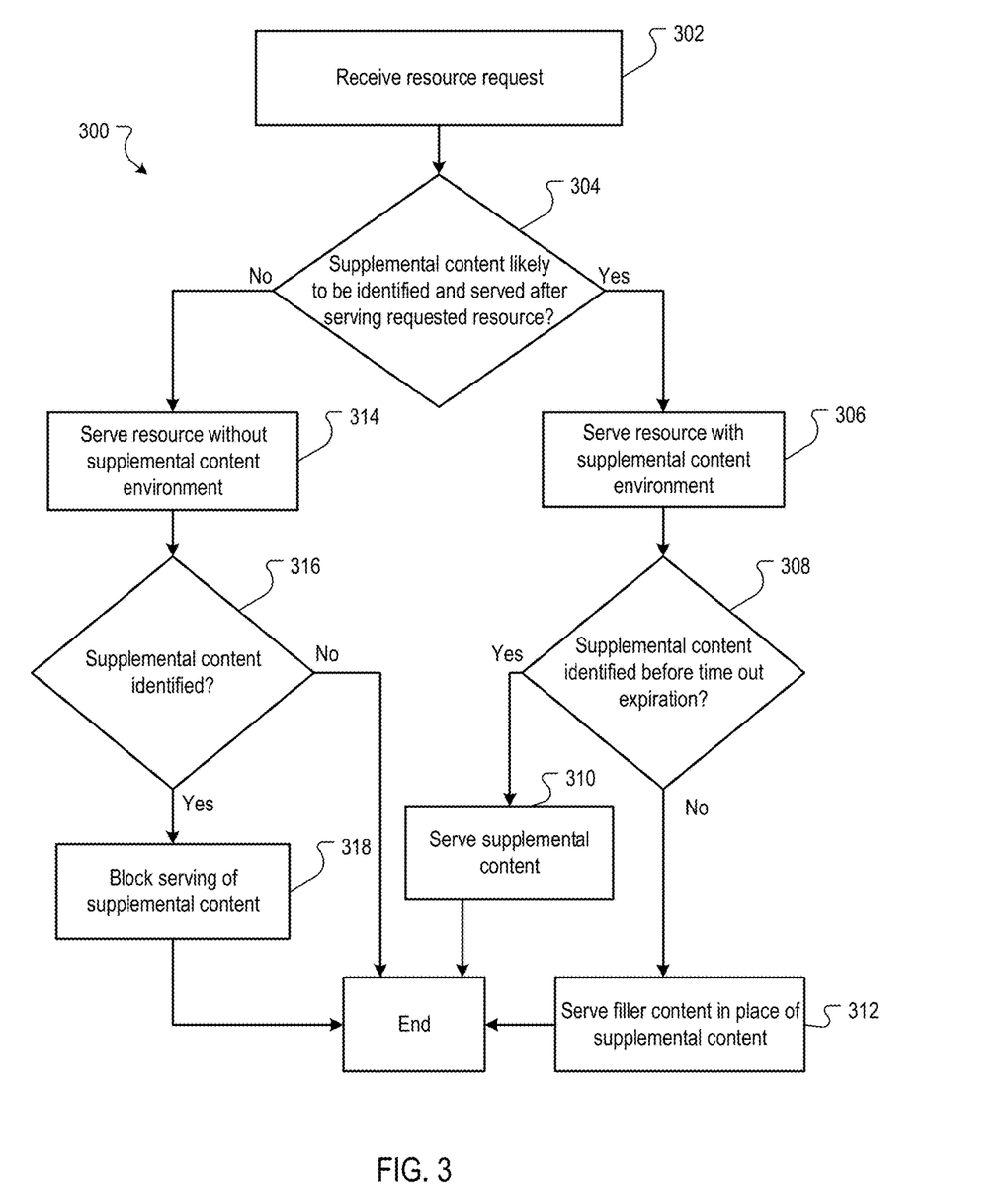
FIG. 3 is a flow diagram of an example server-side process for prediction and accommodation of a subsequent ad on a resource webpage.

FIG. 3 is a flow diagram of an example server-side process 300 for prediction and accommodation of a subsequent ad on a resource webpage. The process 300 can be implemented in a publisher content server, such as any of the publishers described above.

A resource request is received (302). The request may include information associated with a search query, information about the user associated with the resource request, information about the system requesting the resource, and other information. The information that is provided in response to the resource request, such as the requested resource and the particular information provided in the resources, is referred to as "original content."

Once the resource request has been received, a prediction is made as to whether supplemental content, such as a subsequent ad, is likely to be identified and served after the serving the requested resource (304). In some implementations, a machine learned prediction engine is used to make the prediction. The prediction engine can be implemented in a data processing apparatus that is implemented in the server that served the resource, or, alternatively, in the advertisement management system 110.

The prediction engine is trained on data from the log of past requests and any supplemental content identified in connection to those requests. A variety of supervised or unsupervised learning techniques can be used to train the prediction engine. Once trained, the prediction engine is used to compare features of a request and information related to that request to feature weights to determine a likelihood of supplemental content such as a subsequent ad being served. The likelihood can, for example, be probability value between 0 and 1. The likelihood may then be compared against a threshold likelihood to determine whether a supplemental content event has occurred.

In other implementations, a support vector machine can be implemented, and the determination may be a classification, such as "Likely" and "Unlikely." In the case of the former, the resource is served with a supplemental content environment, while in the case of the latter, the resource is not served with the supplemental content environment.

In some implementations, where the resource request includes a search query, the query may be classified and the resulting classification is used to determine the occurrence of a supplemental content event. For example, map resource queries including certain words ("food", "gas", "plumbing", etc.) may be classified according to certain business verticals, and therefore may represent a supplemental content event. Conversely, if the query is a residential address or the name of a city park, the query may be classified as belonging to a non-business vertical, and thus do not represent a supplemental content event.

Map resource requests may also include location information which may either be associated with the request through external information or may be a part of the request itself. A prediction engine can also be trained on this particular feature. In some implementations, if the associated location is identified as being a residential location or in a residential area, the likelihood of supplemental content may be low and therefore not represent a supplemental content event. Alternatively, if the associated location is identified as being a business location or in a commercial area, the likelihood of supplemental content may be high and the resource request associated with a supplemental content event. In the specific case where the query itself is identified as an address, further identification of the address as residential or commercial may impact the determination of a supplemental content event.

In some implementations, predicting the likelihood of serving supplemental content may involve evaluating the set of terms in search query for the underlying resource as a "bag of words", i.e., not considering their order, relative importance, or other contextual factors. In some implementations, the query may be compared with a set of rules and a database of similar queries consulted, after which the occurrence of a supplemental content event is determined without additional processing.

In some implementations, the prediction process is implemented by the publisher serving the requested resource and may therefore be carried out as part of the process of serving the original content. This assures that the prediction will be made before a resource webpage is first displayed, thus assuring that the placeholder is present or absent from the beginning and will not later "blink-in" (which would be contrary to at least some of the purpose of the prediction process). Alternatively, the prediction process may be carried out by the same system that generates the supplemental content, such as an ad server. In some implementations, the server responsible for generating supplemental content may also carry out the relatively lightweight prediction processes that allow it to quickly respond to a service request with a prediction for supplemental content.

In some embodiments, the value representing the likelihood of serving supplemental content is compared against a threshold value to determine whether a supplemental content event has occurred. In some implementations, the threshold may be a set value, such as 50%, 60%, 70%, 80%, or 90%. In some implementations, the threshold may be a dynamic value that changes depending on other factors associated with the resource or the resource request. For example, certain of the classification and identification features described above with respect to the resource request may, rather than or in addition to influencing the likelihood value, influence the threshold against which the likelihood value is compared.

If it is determined that supplemental content, such as a subsequent ad, is likely to be identified and served, then the resource is served to accommodate the supplemental content, such as by including a supplemental content item environment (e.g., an ad space) for supplemental content in the display of the resource (306). In some implementations, the supplemental content environment may be a placeholder as discussed above. In some implementations, insertion of the space for supplemental content comprises, for example, inserting code into the document object model, and the code includes instructions that generate the space in which advertisements may be rendered, such as in the example shown in FIGS. 2A-2B and described above.

In some implementations, the process 300 ends after step 306. In other implementations, the process 300 may continue with additional processing after step 306. The additional processing accounts for when supplemental content is not served, or is not served in a timely manner.

An expiration of a timeout is monitored and ad determination is made as to whether supplement content is identified before the expiration of the timeout (308). If supplement content is identified before the expiration of the timeout, then the supplemental content is served (310). For example, if the time out is 500 milliseconds, and an advertisement is identified for serving at 200 milliseconds, then the advertisement management system 110 serves the advertisement. The time window may be set according to the historical performance of the system providing supplemental content; for example, if more than 90% of the cases where supplemental content was identified to be served involved a latency of less than 500 milliseconds, then the time window may be set to 500 milliseconds.

In some implementations, where the supplemental content is an advertisement, the time window may also be set based on advertising effectiveness; for example, if empirical data show that advertisements that are served up to 10 seconds after a resource is rendered still have an acceptable engagement rate, but advertisements served after 10 seconds do not have an acceptable engagement rate, then the time window is 10 seconds. The engagement rate is a measure of a rate of interaction or effectiveness of an advertisement, e.g., a click through rate, measurement of brand recall, or some other advertising metric that can be measured.

In response to the supplemental content being served, the supplemental content is rendered in the supplemental content environment of the resource. Logs or records may be updated to reflect that the supplemental content was identified and served.

If the time window expires without supplemental content being identified, then default supplemental content, such as filler content, may be served in the space reserved for the supplemental content (312). Example filler content is a filler ad, which may be a public service announcement, a non-profit advertisement, a reservation make-up, etc. The filler ad may be requested from the advertisement system, or may be already supplied to a front end system. In alternate implementations, no further steps may be taken, i.e., no filler ad is served.

Returning to 304, if it is determined that supplemental content, such as a subsequent ad, is not likely to be identified, then the resource is served without a supplemental content environment (314). This may involve the selection of a layout for the resource without room for the supplemental content, or may involve not including any extra space on a results list. In any event, the resource may form a complete layout without any placeholder material.

The sever system can optionally take additional steps after serving the resource without supplemental content. For example, the system may monitor for the identification of supplemental content (316). If no supplemental content is identified then no further action need be taken with respect to the supplemental content prediction and accommodation process.

Conversely, if supplemental content is identified then the supplemental content can be precluded from being served (318). The event may be recorded so that future similar resource requests may benefit from a more accurate prediction. The presence of events in which identified ads were blocked from display may influence the likelihood calculation or decrease the threshold in order to reduce the number of times a subsequent ad is blocked.

Alternatively, the supplemental content may be served, which will result in a blink-in effect. However, in this latter implementation, the number of blink-in effects for a population is reduced, thereby increasing the overall user experience.

Figure 4A:
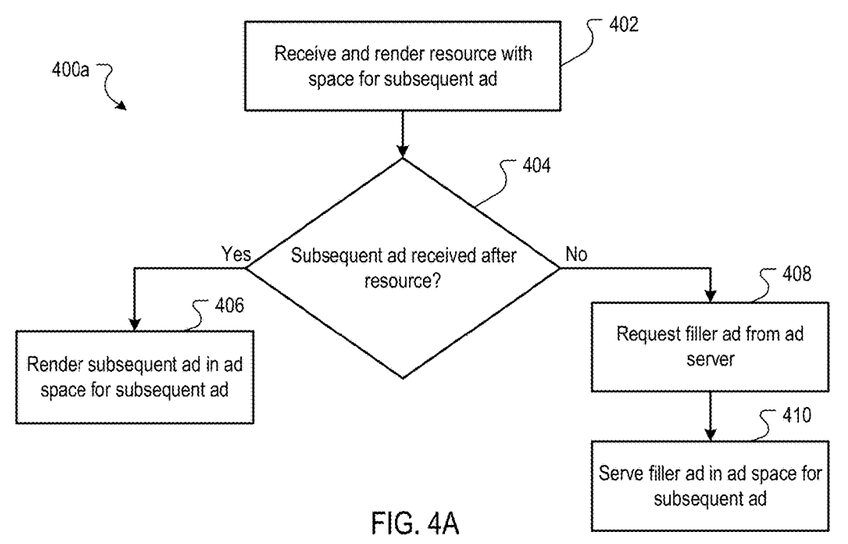
FIGS. 4A and 4B are flow diagrams of example client-side processes for prediction and accommodation of a subsequent ad on a resource webpage.
Figure 4B:
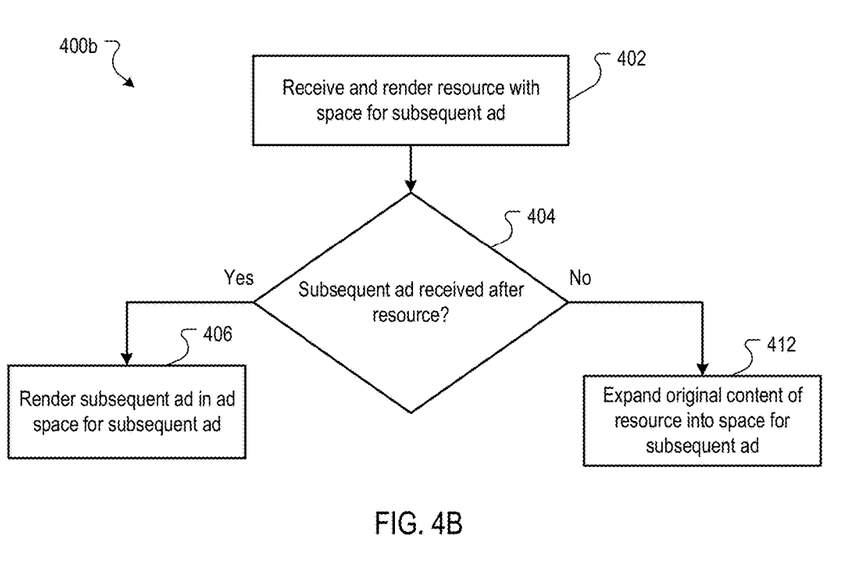

FIGS. 4A and 4B represent additional client-side steps that may take place as part of supplemental content prediction and accommodation processes. The processes 400a and 400b are described in the context of advertisements as supplemental content, but the processes 400a and 400b can be applied to any type of supplemental content.

In both flowcharts 400a and 400b, a resource is received and rendered, including space for a subsequent ad (402). The process then determines if a subsequent ad is received (404). If a subsequent ad is received, the ad is rendered in the space reserved for it (406).

If a subsequent ad is not received, then the client may behave in different ways, illustrated by the different implementation flowcharts 400a and 400b of FIGS. 4A and 4B. As shown in FIG. 4A, a further request to an ad server may be made for an ad to serve in the ad space (408). As discussed above, this ad is referred to as a filler ad, and may be a first party ad for the system's services, may be a charity ad or make-good, or may be a default ad that is generated by the system based on some property of the resource. The filler ad is displayed in place of the subsequent ad that was not received (410).

An alternative implementation is shown in FIG. 4B, where instead of requesting further content, the client may modify the display of the resource to appropriate the reserved space for existing content (412). For example, where the space is inserted into a results list, a further search result that was not shown to make room for the subsequent ad may be supplied in the place of the ad. Additional information about the existing content or further options for interaction with the existing content may be placed in the space. Finally, where the space was an overlay occluding other content, the overlay may be removed to better display the occluded content.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

Figure 5:
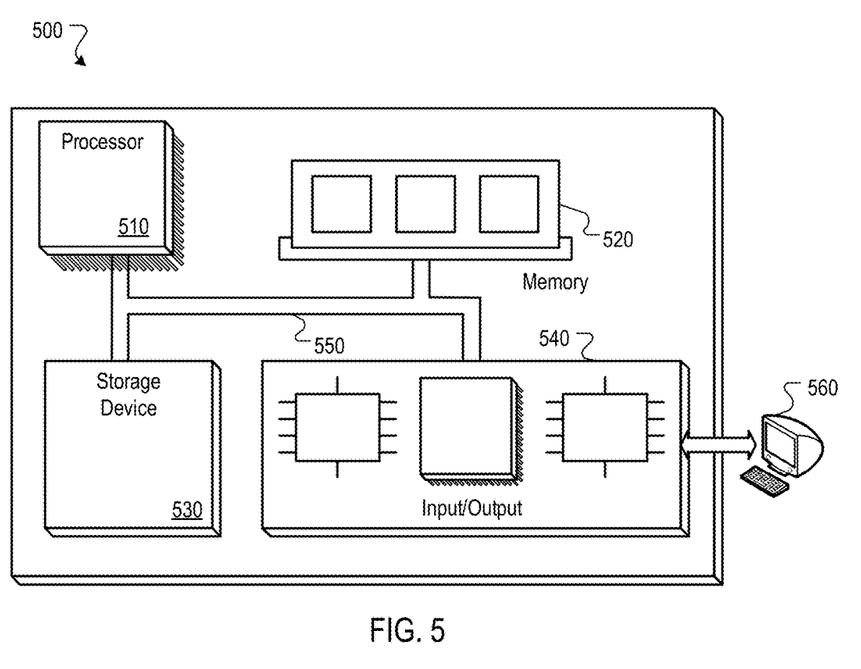
FIG. 5 is a block diagram of a programmable processing system.

An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
determining, by one or more computers, for each of a plurality of resource requests for a resource that includes first content, a likelihood that supplemental content will be served to a user device after the resource is served to the user device; and
for each resource request for which the likelihood meets a threshold likelihood:
serving the resource with a defined supplemental content environment in which the supplemental content is to be displayed, the supplemental content environment being of dimensions that accommodate display of the supplemental content without adjustment of display of the first content upon the user device rendering the resource; and
including instructions in the resource that cause the client device to request additional content after expiration of a time period during which the supplemental content is not received at the client device;
wherein:
each resource request includes a query; and
determining a likelihood that supplemental content will be served to a user device after the resource is served to the user device comprises determining the likelihood based on the query.

2. A computer-implemented method, comprising:
determining, by one or more computers, for each of a plurality of resource requests for a resource that includes first content, a likelihood that supplemental content will be served to a user device after the resource is served to the user device; and
for each resource request for which the likelihood meets a threshold likelihood:
serving the resource with a defined supplemental content environment in which the supplemental content is to be displayed, the supplemental content environment being of dimensions that accommodate display of the supplemental content without adjustment of display of the first content upon the user device rendering the resource; and
including instructions in the resource that cause the client device to request additional content after expiration of a time period during which the supplemental content is not received at the client device;
further comprising, for a resource request for which the likelihood met the threshold likelihood:
receiving, from a user device, a request for additional content in response to the expiration of the time period; and
serving the serving additional content to the user device for display in the supplemental content environment.

3. A computer-implemented method, comprising:
determining, by one or more computers, for each of a plurality of resource requests for a resource that includes first content, a likelihood that supplemental content will be served to a user device after the resource is served to the user device; and
for each resource request for which the likelihood meets a threshold likelihood:
serving the resource with a defined supplemental content environment in which the supplemental content is to be displayed, the supplemental content environment being of dimensions that accommodate display of the supplemental content without adjustment of display of the first content upon the user device rendering the resource; and including instructions in the resource that cause the client device to request additional content after expiration of a time period during which the supplemental content is not received at the client device;

further comprising precluding the serving of supplemental content to a user device that received a resource in response to a resource request for which the likelihood does not meet the threshold likelihood.

4. A system, comprising:
one or more computers; and
a storage device storing instructions that are executable by the one or more computers and that upon such execution cause the one or more computers to perform operations comprising:
  determining, by one or more computers, for each of a plurality of resource requests for a resource that includes first content, a likelihood that supplemental content will be served to a user device after the resource is served to the user device; and
  for each resource request for which the likelihood meets a threshold likelihood:
    serving the resource with a defined supplemental content environment in which the supplemental content is to be displayed, the supplemental content environment being of dimensions that accommodate display of the supplemental content without adjustment of display of the first content upon the user device rendering the resource; and
    including instructions in the resource that cause the client device to request additional content after expiration of a time period during which the supplemental content is not received at the client device;
  wherein:
    each resource request includes a query; and
    determining a likelihood that supplemental content will be served to a user device after the resource is served to the user device comprises determining the likelihood based on the query.

5. A system, comprising:
one or more computers; and
a storage device storing instructions that are executable by the one or more computers and that upon such execution cause the one or more computers to perform operations comprising:
determining, by one or more computers, for each of a plurality of resource requests for a resource that includes first content, a likelihood that supplemental content will be served to a user device after the resource is served to the user device; and
for each resource request for which the likelihood meets a threshold likelihood:
  serving the resource with a defined supplemental content environment in which the supplemental content is to be displayed, the supplemental content environment being of dimensions that accommodate display of the supplemental content without adjustment of display of the first content upon the user device rendering the resource; and
  including instructions in the resource that cause the client device to request additional content after expiration of a time period during which the supplemental content is not received at the client device;
the operations further comprising, for a resource request for which the likelihood met the threshold likelihood:
  receiving, from a user device, a request for additional content in response to the expiration of the time period; and
  serving the additional content to the user device for display in the supplemental content environment.

6. A system, comprising:
one or more computers; and
a storage device storing instructions that are executable by the one or more computers and that upon such execution cause the one or more computers to perform operations comprising:
  determining, by one or more computers, for each of a plurality of resource requests for a resource that includes first content, a likelihood that supplemental content will be served to a user device after the resource is served to the user device; and
  for each resource request for which the likelihood meets a threshold likelihood:
    serving the resource with a defined supplemental content environment in which the supplemental content is to be displayed, the supplemental content environment being of dimensions that accommodate display of the supplemental content without adjustment of display of the first content upon the user device rendering the resource; and
    including instructions in the resource that cause the client device to request additional content after expiration of a time period during which the supplemental content is not received at the client device;
  the operations further comprising, precluding the serving of supplemental content to a user device that received a resource in response to a resource request for which the likelihood does not meet the threshold likelihood.

7. A storage device storing instructions that are executable by one or more computers and that upon such execution cause the one or more computers to perform operations comprising:
  determining, by one or more computers, for each of a plurality of resource requests for a resource that includes first content, a likelihood that supplemental content will be served to a user device after the resource is served to the user device; and
  for each resource request for which the likelihood meets a threshold likelihood:
    serving the resource with a defined supplemental content environment in which the supplemental content is to be displayed, the supplemental content environment being of dimensions that accommodate display of the supplemental content without adjustment of display of the first content upon the user device rendering the resource; and
    including instructions in the resource that cause the client device to request additional content after expiration of a time period during which the supplemental content is not received at the client device;
  wherein:
  each resource request includes a query; and
  determining a likelihood that supplemental content will be served to a user device after the resource is served to the user device comprises determining the likelihood based on the query.

8. A storage device storing instructions that are executable by one or more computers and that upon such execution cause the one or more computers to perform operations comprising:
  determining, by one or more computers, for each of a plurality of resource requests for a resource that includes first content, a likelihood that supplemental content will be served to a user device after the resource is served to the user device; and for each resource request for which the likelihood meets a threshold likelihood:

serving the resource with a defined supplemental content environment in which the supplemental content is to be displayed, the supplemental content environment being of dimensions that accommodate display of the supplemental content without adjustment of display of the first content upon the user device rendering the resource; and including instructions in the resource that cause the client device to request additional content after expiration of a time period during which the supplemental content is not received at the client device;

the operations further comprising, for a resource request for which the likelihood met the threshold likelihood:

receiving, from a user device, a request for additional content in response to the expiration of the time period; and serving the serving additional content to the user device for display in the supplemental content environment.

9. A storage device storing instructions that are executable by one or more computers and that upon such execution cause the one or more computers to perform operations comprising:

determining, by one or more computers, for each of a plurality of resource requests for a resource that includes first content, a likelihood that supplemental content will be served to a user device after the resource is served to the user device; and for each resource request for which the likelihood meets a threshold likelihood:

serving the resource with a defined supplemental content environment in which the supplemental content is to be displayed, the supplemental content environment being of dimensions that accommodate display of the supplemental content without adjustment of display of the first content upon the user device rendering the resource; and including instructions in the resource that cause the client device to request additional content after expiration of a time period during which the supplemental content is not received at the client device;

the operations further comprising precluding the serving of supplemental content to a user device that received a resource in response to a resource request for which the likelihood does not meet the threshold likelihood.

* * * * *